United States Patent
Sprokel

[11] 3,876,287
[45] Apr. 8, 1975

[54] BIREFRINGENT LIQUID CRYSTAL STRUCTURE

[75] Inventor: Gerard J. Sprokel, Fishkill, N.Y.

[73] Assignee: International Business Machines Corporation, Armonk, N.Y.

[22] Filed: June 29, 1973

[21] Appl. No.: 375,193

[52] U.S. Cl. .................................. 350/160 LC
[51] Int. Cl. ................................. G02f 1/20
[58] Field of Search ....................... 350/160 LC

[56] References Cited
UNITED STATES PATENTS
3,167,607  1/1965  Marks et al. .............. 350/160 X
3,512,876  5/1960  Marks ...................... 350/267

OTHER PUBLICATIONS

IBM Tech. Discl. Bltn., "Liquid Crystal Light Modulator and Scanner" by Holzman, Vol. 8, No. 1, June 1965, p. 151.

Primary Examiner—Ronald L. Wibert
Assistant Examiner—Paul K. Godwin
Attorney, Agent, or Firm—Henry Powers

[57] ABSTRACT

A field-effect liquid crystal structure having birefringent properties controlled by crossed electric fields in conjunction with crossed polarizing units.

24 Claims, 11 Drawing Figures

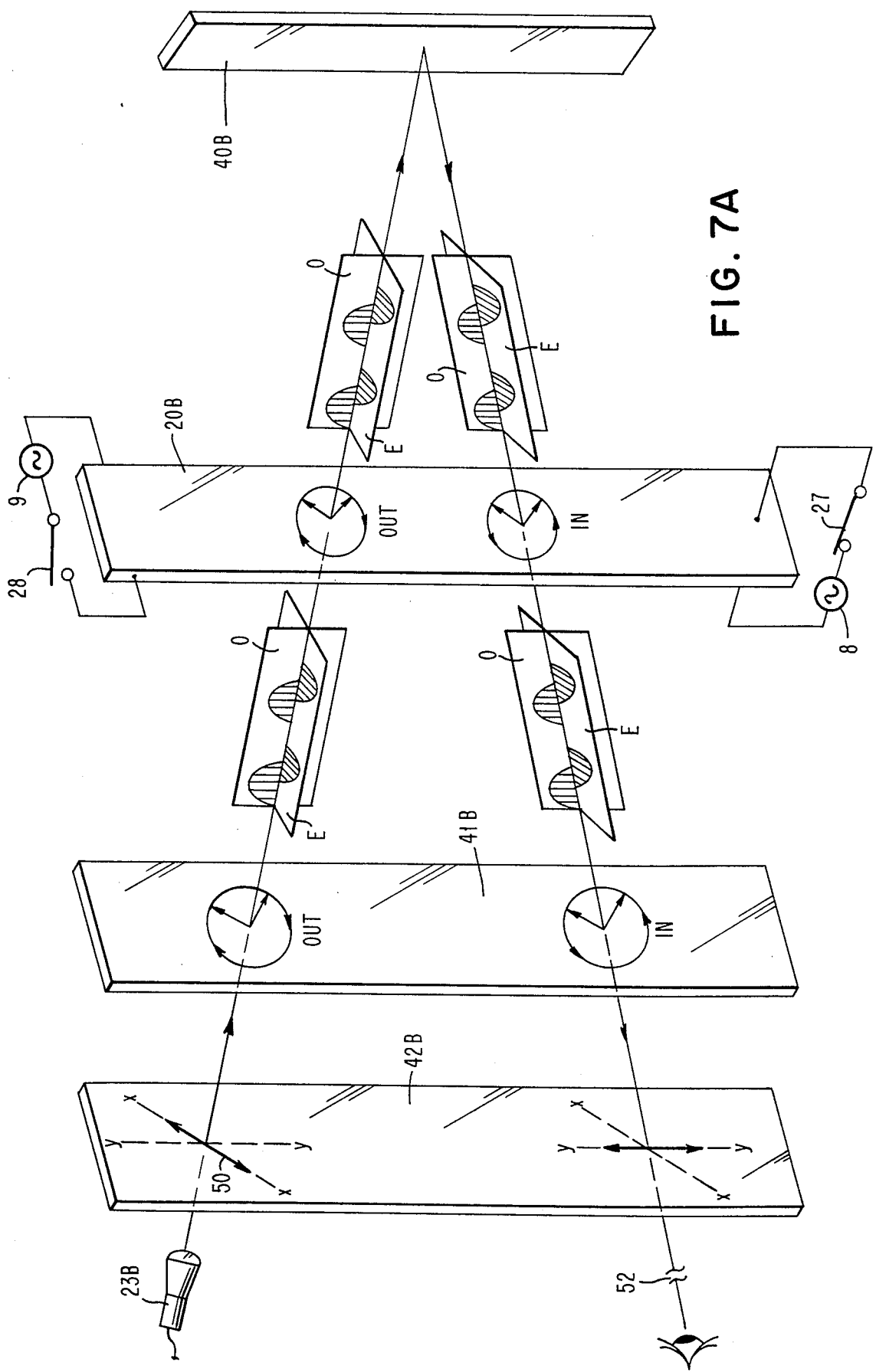

BIREFRINGENT LIQUID CRYSTAL STRUCTURE

FIELD OF THE INVENTION

This invention relates to electro-optic systems, and more particularly to nematic liquid crystal displays.

BACKGROUND OF THE INVENTION

The birefringent properties of nematic liquid crystal compositions have been utilized in the fabrication of electro-optic information systems such as displays. Illustrative units and their theories of operation can be found in U.S. Pat. Nos. 3,364,433, 3,663,086, 3,669,525, 3,687,515 and 3,694,053, and in the field review "Liquid Crystal Displays Brighten" by E. E. Spow on pp. 112 to 117 in Machine Design, Sept. 7, 1972.

Among such systems, pertinent to this invention, are those utilizing field effect displays utilizing a film of a nematic liquid crystal material whose birefringent characteristics can be controlled in an electric field for differentiation by cross-polarizers. In such a device the molecules of a nematic liquid crystal composition, such as one having negative dielectric properties, will be aligned in a reference direction normally coextending with the optical path of light transmission therethrough. Generally, such alignment can be augmented by doping with surfactants such the polymeric resin commercially sold under the trademark Versamide by General Mills Inc. In such molecular orientation, the nematic material exhibits isotropic optical properties which do not affect the transmission of light but which can be extinguished by the use of cross-polarizers.

On application of an electric field transverse the reference direction of initial molecular arrangement, re-orientation thereof is induced, in the direction of the applied field transforming the nematic liquid crystal material into an anisotropic optical mode for light transmission along the original optical path; e.g. the reference direction of the liquid crystal original molecular orientation.

Such selective variation of the isotropic and anisotropic transmission of light through the nematic liquid crystals film can be differentiated by cross-polarizer means, normally by means of optical polarizer and analyzer elements between which the liquid crystal field-effect cell is disposed along the optical path of light transmission.

It has been found that such field-effect displays of the prior art are characterized with various disadvantages. For example, in the absence of surfactants or dopants for enhancing the molecular alignment of the nematic liquid composition, it is difficult to obtain complete and/or reproducible molecular alignment of the nematic liquid crystal in any one cell or in adjacent cells of a display. Displays utilizing such field-effect cells have been found to show not only large variations along and across the display, but also within and across component cells of the display.

Also, it has been found that use of known surfactants (compatible with the nematic liquid crystal compositions) eventually results in their breakdown resulting in degradation of the liquid crystal display.

SUMMARY OF THE INVENTION

In contrast to the prior art it has been discovered that positive reorientation of nematic liquid crystal materials can be effected by a novel electrode configuration without the disadvantageous use of surfactants or other dopants heretofore employed for such purpose.

Broadly speaking, the invention described herein comprehends a novel modification of field-effect liquid crystal cells to enable the provision of electrical cross-field to control the molecular orientation of isotropic and anisotropic optical characteristic of an electro-optic nematic liquid crystal composition along an optical path of light transmission therethrough. This is accomplished by sandwiching the nematic liquid crystal material between a pair of opposed and insulated electrodes, normally transparent and disposed along the optical path of the device, in conjunction with a second pair of opposed electrodes disposed transverse the optical transmission path and sandwiched between and adjacent the insulation of the first electrode pair. Normally, the cell structure will comprise a segment of a multitude thereof disposed in the requisite array of an informational display. Operation of such displays is obtained by generation of a dominant electric field across a selected one of the electrode pairs in accordance with the information to be displayed. Control of the electric field determines the orientation of the isotropic and anisotropic molecular orientation of the nematic liquid crystal material in the optical path of light transmission therethrough.

Differentiation of light transmission through the isotropic and anisotropic orientation of the nematic material, can be accomplished by suitable cross-polarizer means disposed along the path of light transmission. Typically, for operation of the cell in a transmissive mode, the polarizer can comprise a polarizer element across the light transmissive path one side of the cell units and an analyzer element across the light transmission path on the other side of the cell units.

For reflective operating modes, the cross-polarizer means can comprise a reflecting surface in the light transmission path on one side of the liquid crystal structure, with a polarizer and a quarter wave plate in the optical path on the other side of the cell units normally disposed adjacent the quarter wave element.

In general, when a dominant electric field is impressed parallel to the light transmission path, the nematic liquid crystal molecules will be isotropically oriented with light transmission through the cell extinguished by the cross-polarized unit providing darkened viewing areas. Conversely, when the dominant electric field is impressed transverse the light path, the nematic liquid crystal cells will be anisotropically oriented which permit light passage through the cross-polarizer unit as bright viewing areas.

Accordingly, it is an object of this invention to eliminate disadvantages of the prior art.

It is another object of this invention to provide a novel nematic liquid crystal display having improved information imaging.

It is also an object of this invention to provide a nematic liquid crystal cell whose birefringent characteristics are maximized for improved informational displays.

It is still another object of this invention to provide nematic liquid crystal cell structure wherein the isotropic and anisotropic molecular orientation can be maximized for differentiation providing improved informational displays.

The foregoing and other objects, features and advantages of the invention will be apparent from the following more particular description of preferred embodiments of the invention as illustrated in the accompanying drawings.

BRIEF DESCRIPTION OF THE DRAWINGS

FIGS. 7A and 7B are schematic representations of light transmission through the second embodiment in operation thereof.

DESCRIPTION OF THE PREFERRED EMBODIMENTS

Figure 1:
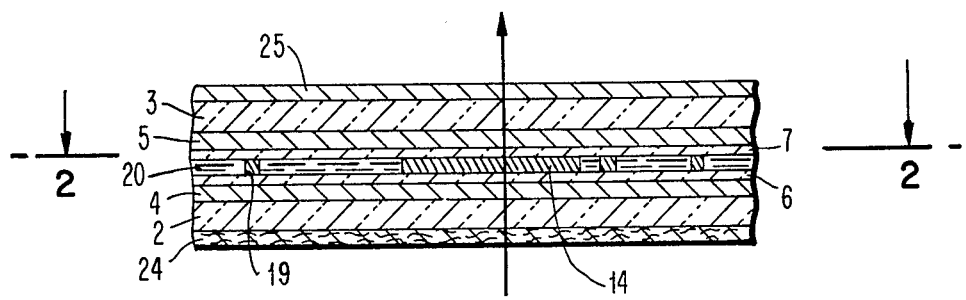
FIG. 1 is a cross-sectional view illustrating one embodiment of this invention for a transmissive operating mode of a numeric display.
Figure 2:
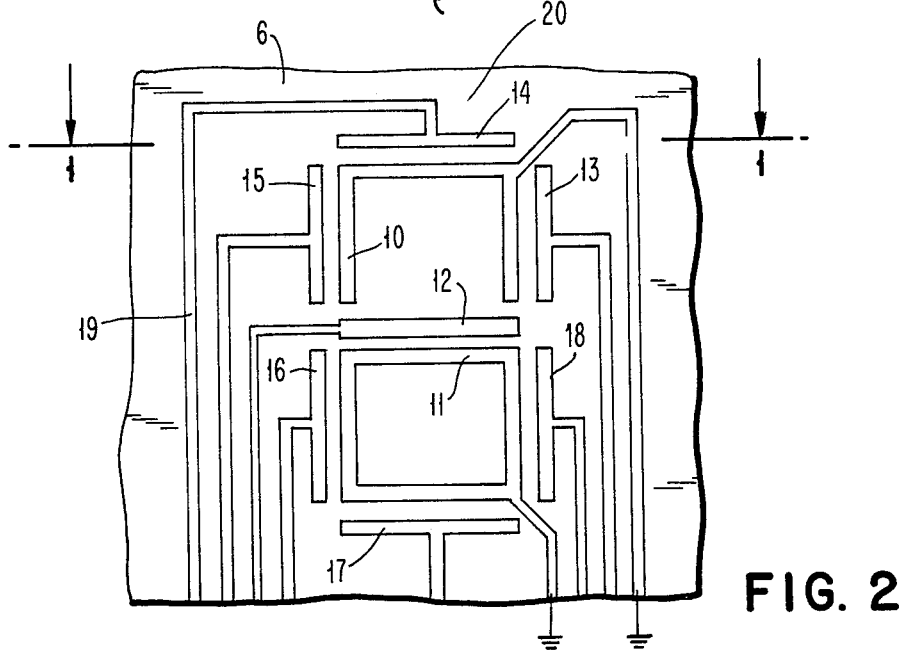
FIG. 2 is a vertical view taken along line 2—2 of FIG. 1.
Figure 5:
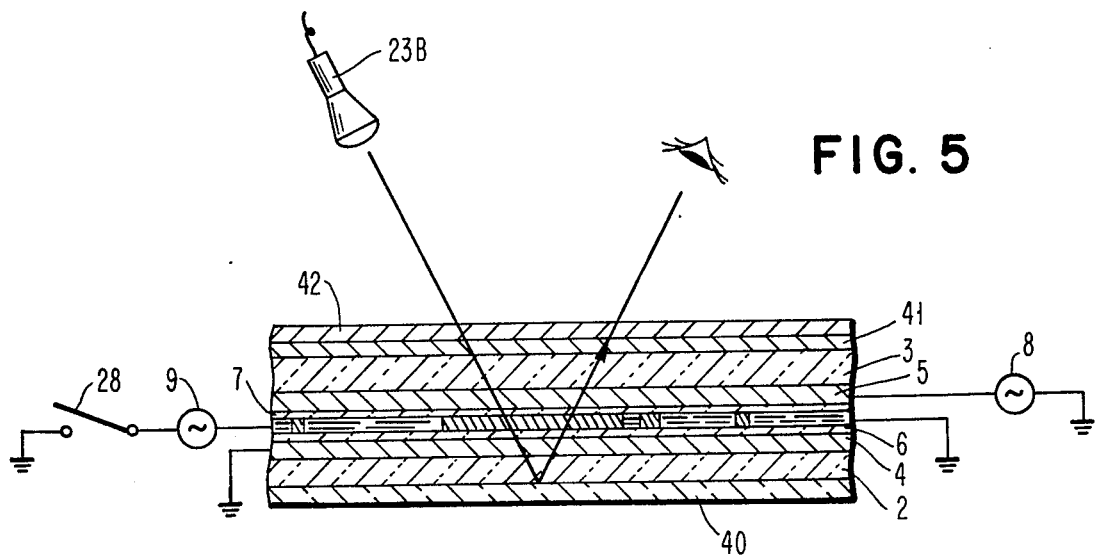
FIG. 5 is a cross-sectional view illustrating another embodiment of this invention adapted for reflective operating modes.

In FIGS. 1 and 2, a field-effect liquid crystal cell structure is shown as a display assembly for optical representation of desired configurations, here specifically illustrated as a numerical display.

The cell structure, in its broadest sense, comprises two pairs of electrodes for generating corresponding crossed-electric field across a thin film (e.g. of the order of 10 to 20 microns) of a nematic liquid crystal material having positive dielectric properties whose indicatrixes are controlled to enable operation of the cell in accordance with this invention. Conventionally, these nematic liquid crystal materials are characterized by the ability of molecular alignment parallel to an applied electric field. In accordance with this invention such molecular alignment is selective oriented in the direction of a selectively induced dominating field across selected ones of two pair of crossed electrodes. Typically, one pair of opposed electrodes will be aligned in a reference direction, normally in the direction of the light transmission path; and a second pair of electrodes will be aligned transverse the reference direction normally perpendicular to the light transmission path. Development of a dominating field across a selected pair of opposed electrodes results in a corresponding molecular alignment of the liquid crystal material in the direction of the dominating electric field. Controlled directivity of the dominating electric field enables the liquid crystal material to be employed as an optical birefringent element for purposes of this invention.

Illustratively, the molecular alignment of the nematic liquid crystal material can be isotropically oriented by provision of a dominating electric field parallel to the light transmission path. Conversely, the molecular alignment of the nematic liquid crystal composition can be anisotropically aligned by the provision of an electric field in a direction transverse the path of light transmission through the material.

Preferred embodiments of such nematic liquids are those having positive anisotropy. The term positive anisotropy indicates that the component of the permittivity parallel to the molecular axis is larger than the compound perpendicular to this axis. In symbolic form $\xi_{\parallel} > \xi_{\perp}$ where $\xi$ denotes the permittivity and the subscripts $\parallel$ and $\perp$ refer to parallel respectively perpendicular orientation. Similarly, the anisotropy of the conductivity is positive. In symbolic form $\sigma_{\parallel} > \sigma_{\perp}$ Illustrative of such nematic material are a. derivatives of benzylidene p amino benzonitrile of the general form

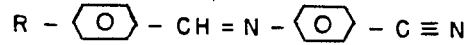

where R is butoxy up to hexyloxy or equivalent anoyloxy homolog b. certain esters of the form

where R and R' is butyl to heptyl.

c. materials of proprietary composition such as Kodak nematic mixture (catalog No. 11900) provided the mixture has positive anisotropy.

It will be understood that the compounds listed above serve only by way of example. The general criterion is not the chemical structure but rather the dielectric anisotropy. It is found that smaller electric fields are required if the anisotropy is larger, other properties being comparable. Thus for the benzonitrile $\xi_{\parallel}$ is of the order of 20–30 and $\xi_{\perp}$ is about 5–7. For diesters $\xi_{\parallel}$ is about 7 and $\xi_{\perp}$ is about 5. The Kodak mixture has $\epsilon_{\parallel}$ about 8.5 and $\epsilon_{\perp}$ about 7. The conductivity anisotropy is about 1.4.

The electrode pair assembly in the direction of the optical path (O.P.) of light transmission comprises any suitable front transparent dielectric support 2 (of glass and the like) and a like back support 3 with both having their inner opposed faces coated with respective thin transparent conductive films 4 and 5, as for example, indium oxide, tin oxide, etc., which conveniently can coextend with the entire inner faces of supports 2 and 3. However, it is to be understood that where applications require it, electrodes 4 and 5 can be segmented to coextend with corresponding discrete cell segmental units of the liquid crystal display in accordance with the desired mode of informational display. Typically these electrode films can be deposited in thicknesses of about 1,000 angstroms.

In turn, the entire electrode patterns 4 and 5 are overcoated with respective films 6 and 7 of a dielectric insulating material which is deposited over the entire inner faces of supports 2 and 3. Typical dielectric compositions for application are $Al_2O_3$, $SiO_2$, $Si_3N_4$ and the like which may be coated in any suitable manner, as by R. F. sputtering. Illustrative of such insulating coatings are RF sputtered films of $Al_2O_3$ in thicknesses of 1000 angstroms and $SiO_2$ coatings in thickness of 1000 angstroms. However, the specific thicknesses of the dielectric films 6 and 7 are not critical, since they are mere matters of design readily determinable for providing the necessary operating voltages and/or frequencies from practical and reasonable signal sources, illustrated as sources 8 and 9 on the drawings; e.g. FIGS. 3A and 3B.

The dielectric insulation can also be an organic material such as a polymer film. In particular polymide coatings up to several microns have been used.

Interposed between the inner dielectric coating 6 and 7 is a pattern 20 of conductive electrode segments 10 to 18, each of which has a discrete lead segment 19 which extends to an edge of the device where connection can be made to switches or addressing circuits (not shown) for connecting to a signal source. The electrode pattern 20 is shown as applied for seven-segment numeric display formed by selective control of an electric field between appropriate electrode segments which extend transverse the optical axis (O.P.) of light transmission for corresponding molecular alignment, when much field is dominant across the liquid crystal material.

As shown, electrode segments 10 and 11 comprise ground references for the electrode pattern 20, with the seven segments of the numeric display corresponding to electrode combinations: (a) 11–12, (b) 10–13, (c) 10–14, (d) 10–15, (e) 11–16, (f) 11–17, and (g) 11–18. By selective application of a voltage source to electrode segments 12 to 18, via leads 19, corresponding electric fields can be imposed between the main segments 12 to 18 and adjacent associated reference (e.g. ground) electrodes 10 or 11. As indicated above, these segmented fields will extend transverse the optical axis (A.O) of light transmission, through the cell from a light source 21 conveniently coherent. In general, the electrode pattern 20 can be deposited by a conventional technique such as RF sputtering, chemical vapor deposition, etc., on at least one of dielectric layers 4 and 5 in typical thicknesses of about 0.05 to 0.1 microns, with lateral spacing between them of the order of 0.001 to 0.010 inches. However, it is to be understood that such spacing will normally be a matter of design for specific applications desired. These electrode segments 10 and 18 need not extend completely across the cell thickness (e.g. liquid crystal film) between the insulating layers 4 and 5, but only part way thereacross, wherein the film thicknesses of the nematic liquid crystal material may be of about the same or greater thickness, e.g. 0.02 mils and up to 0.5 mils.

Also provided with the cell structure is a crosspolarizer means for differentiation of light transmission through the unit from the light source 23 which may, if required, be employed with collimaters, as desired. In the embodiment shown, the cross-polarizer comprises a polarizing element 24 and an analyzer element 25 on respective opposite sides of the cell structure and disposed along the reference direction or optical path (O.P.) of light transmission. For compactness, the polarizer element 24 may conveniently be laminated, as shown in the drawing, to the outer face or surface of back support 2 and the analyzer 25 laminated to the outer face or surface of front support 3.

Figure 3A:
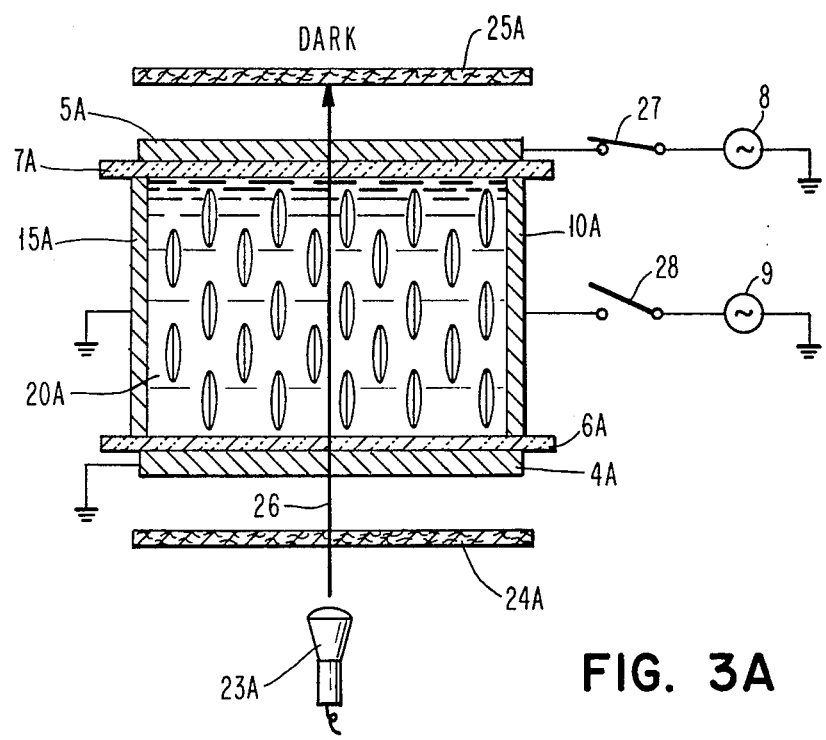
FIGS. 3A and 3B are diagramic representations of the embodiment of FIG. 1 for illustrating the transmissive operating mode thereof.
Figure 3B:
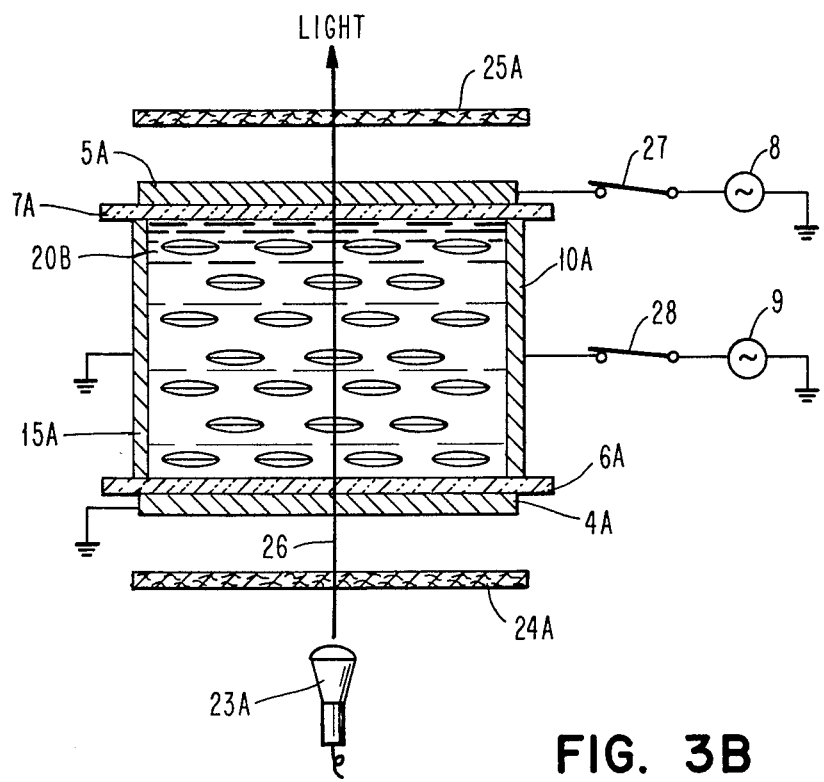

For purposes of describing operation of this embodiment of the invention, explanatory diagrams of FIGS. 3A, 3B, 4A and 4B, are provided for reference and convenience. In FIGS. 3A and 3B the same numerals plus the letter A are applied to corresponding elements of these FIGURES and FIGS. 1 and 2. For example, in this explanation, electrodes 4 and 5 are employed and represented as 4A and 5A for an illustrative cell segment. As can be seen, spaced and transparent electrodes 4A and 5A are provided on their inner facing surfaces with respective dielectric and transparent films 6A and 7A between which is disposed a spaced transverse pair of electrodes 10A and 15A. As shown, the spaced electrode pair 4A and 5A is disposed along the optical path 26 of light transmission through the cells from a light source 23A. Cooperatively, the electrode pair 10A and 15A are disposed transverse the optical path 26, and on connection to a signal source 9 have their electric field extending in cross-relation to the electric field resulting when a signal source 8 is impressed through switch 27 across the electrode pair 4A and 5A. Illustratively, the signal source 8 can be assumed as a 10 KHz a.c. voltage source of 10 to 30 volts, and the signal source 9 is a 100 Hz a.c. voltage source of 5–20 volts. It is to be understood that although a.c. signal source 9 is shown and preferred, d.c. source can also be employed alone or in combination with a.c. sources where desired or required for any particular application.

As can be seen, the configuration of spaced electrodes 4A/5A/10A/15A defines a confined volume of a nematic liquid crystal film 20A which as indicated above can be about 12 microns thick.

In the absence of any applied voltage (e.g. switches 27 and 28 open) across any of electrode paiars 4A–5A and 10A–15A, no electric fields are present, and the long axii molecular orientation of the liquid crystal material of film 20A, can be controllably altered by application of an electric field across the original lines of orientation which the molecular configuration of the nematic liquid crystal will follow. Generally, where the nematic liquid crystal molecular orientation is transverse a path of light transmission the molecular arrangement results in an anisotropic orientation in which the nematic material can be used as an optical birefringent element (e.g. an optical retardation plate). Conversely, where the elongated molecular orientation of the nematic liquid crystal material is in a direction parallel to the path of light transmission, the molecular orientation forms an isotropic configuration which will not impede or inhibit the passage of light through the nematic liquid crystal material. In FIGS. 3A and 3B, such isotropic and anisotropic molecular orientation in the nematic liquid crystal film 20A can be controlled by inducing an electric field between a selected one of spaced electrode pairs 4A/5A and 10A/15A.

For one preferred positive operating mode of an information display, the nematic liquid crystal film 20A will be normally maintained in continuous isotropic orientation in the light transmission path 26 by maintaining a continuous electric field between electrode pairs 4A and 5A which is obtained by closing of switch 27 which keeps this electrode pair 4A and 5A continuously connected to the signal source 8 (e.g. 10–20 microvolts at 10 KHz) during operation of the information display, e.g. as in both FIGS. 3A and 3B.

Figure 4A:
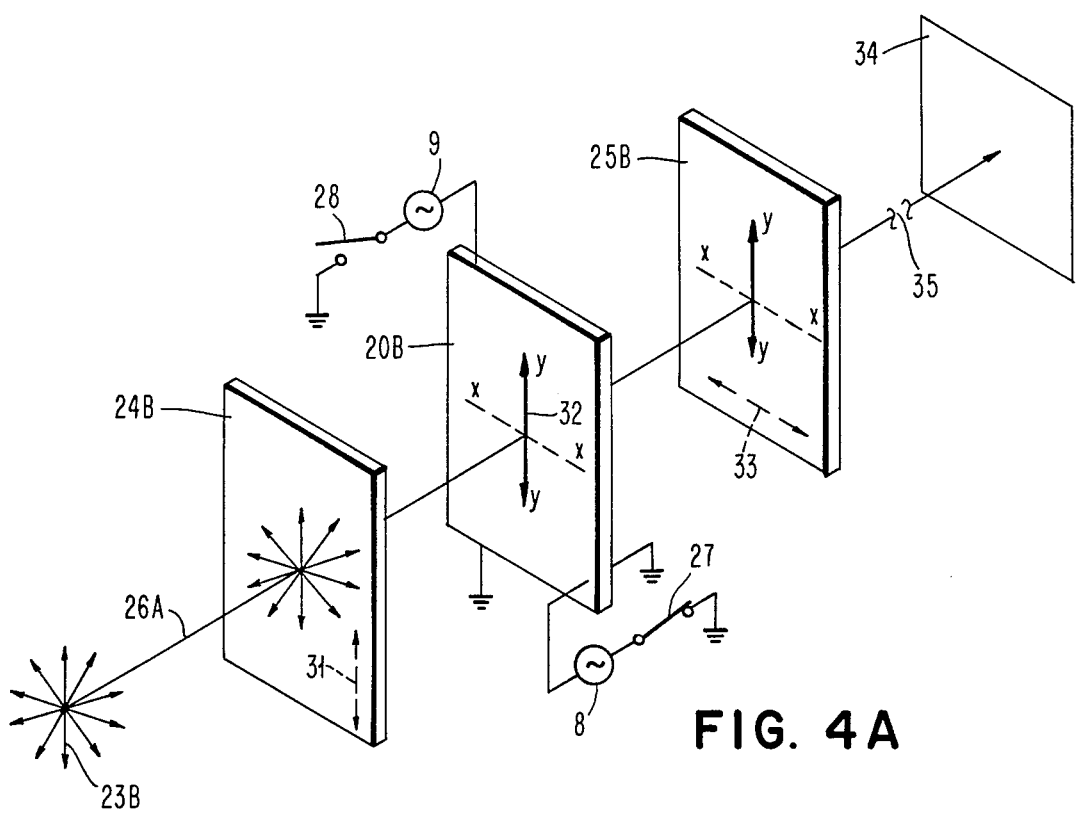
FIGS. 4 and 4B are schematic representations of light transmission through the above embodiment in operation thereof.

With switch 27 closed and switch 28 opened, a potential will be applied (e.g. 10–20 volts at 10 KHz) from signal source 8 across electrode pair 4A/5A creating an electric field between them in a reference direction parallel to the light transmission path 26 from light source 23. As a result, the molecular orientation of the nematic liquid crystal material of film 20A will be in isotropic alignment in the direction of the field between electrode pairs 4A/5A which conversely is in direction parallel to the light transmission pattern path 26 from source 23A. This isotropic configuration of the nematic liquid crystal material allows uninhibited and unmodified passage of light through the liquid crystal medium. As a result, as illustrated in FIG. 4A, when incident light from source 23B is transmitted through a polarizing element 24B it will be plane polarized (as for example) in the direction 31 as shown by incident vector 32 on the nematic liquid crystal film 20B. As a result of the isotropic molecular orientation of the nematic liquid crystal material, the polarization of light beam 26A remains unmodified on passage through the element to impinge on the analyzer 25B, in which configuration is shown as incident light on the incoming face of the analyzer 25B. As a result of analyzer 25B having its direction of polarization 33 normal to that of the polarizing element 24A. Transmission of the light beam 26A is prevented and for all purposes is extinguished at the viewing plane 34, as indicated by the broken light beam portion 35.

Figure 4B:
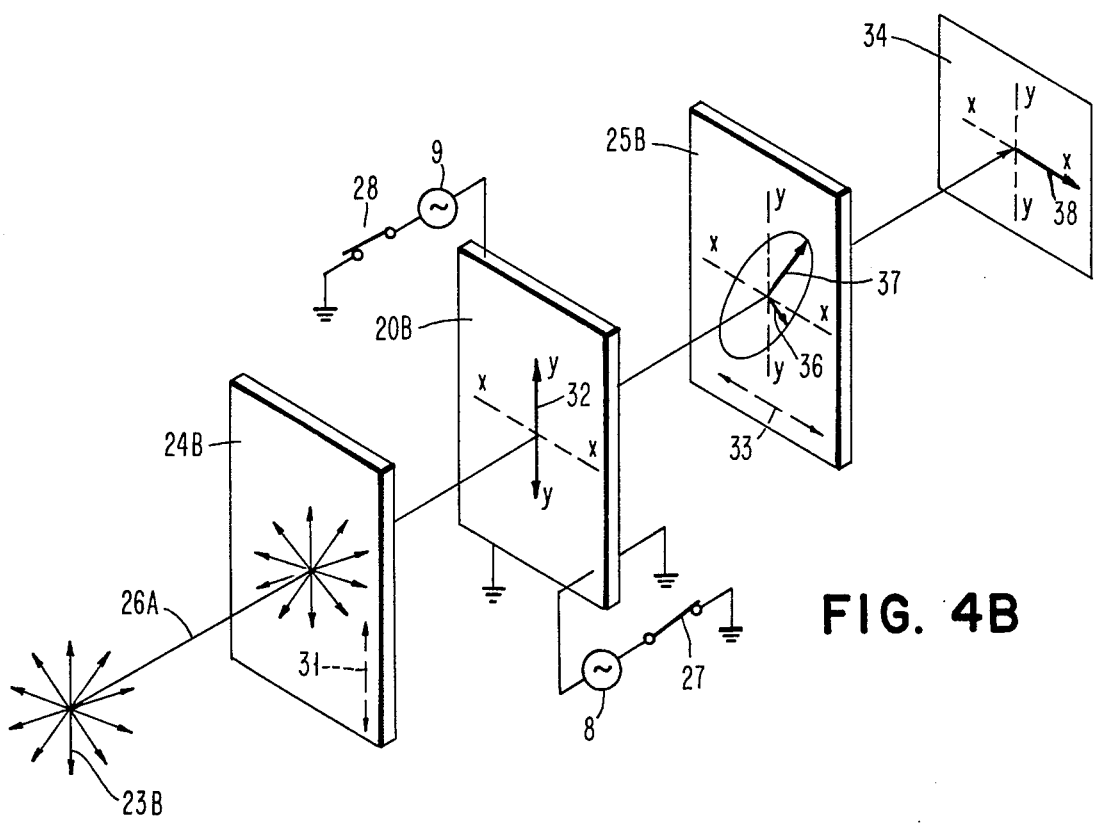

For purposes of activating the viewing areas on the plane of view 34, (as well as in the overall information display system) switch 27 will be, for convenience of operation, maintained closed and switch 28 closed for activating light transmission through the structure by virtue of inducing a dominating electric field between the electrode pair 10A/15A in well known manner, as for example, by impressing a signal across the electrode pair 10A/15A from the value-volt source 9 at 100 Hz. When the dominating field across electrode pair 10A/15A is imposed as shown in FIG. 3B, the molecular orientation of the nematic liquid crystal material will be in the direction of the dominating field so as to present an anisotropic configuration to the passage of light beam 26 from source 23A. This anisotropic molecular orientation of the liquid crystal film 20B across the light beam path 26A converts, in effect, the liquid crystal material into a birefringent optical element which functions as a retardation plate for passage of light through the liquid cell structure. This is illustrated in FIG. 4B showing the passage of light through the liquid cell structure. As in FIG. 4A, light from source 23B on passage through polarizers 24B is shown impinging as vector 32 extending in the direction 31 indicated on polarizer element 24B. As a result of the birefringent activity of liquid crystal film 20B (due to the anisotropic orientation thereof) the incoming light is split into ordinary and extraordinary components which are phase shifted on passage through the liquid crystal film 20B, resulting in a eliptical polarization of the light as illustrated by the vectors 36 and 37 on the incoming face of the analyzer element 25B. Due to the crosspolarizing direction of analyzer 25B the vertical component of vectors 36 and 37 are extinguished while the horizontal components of vectors 36 and 37 pass through the analyzer to impinge as a beam 38, as shown, on the imaging plane 34.

By referencing this functioning mode to the image configuration of FIG. 2, as related to the imaging electrodes, various informational configurations can be selectively generated as exemplified by the specific numeric display of this figure. For example, with electrode segments 10 and 11 reference to ground, the numeral 3 can be generated by exercising electrodes 14, 13, 12, 18 and 17. Similarly, the numeral 8 can be generated by impressing a signal on each of the electrode segments 12 to 18 (via their leads 19), with electrode segments 10 and 11 referenced to ground. The table given below indicates which of the various electrode segments 12 to 18 are exercised for generating a numerical display of zero to numeral 9, with electrode segments 10 and 11 referenced to ground.

Numeric Display with Electrode Segments 10 & 11 Referenced to Ground

| No. | Electrode Segments Exercised |
| --- | --- |
| 0 | 13-14-15-16-17-18 |
| 1 | 15-16- or 13-18 |
| 2 | 14-13-12-16-17 |
| 3 | 14-13-12-18-17 |
| 4 | 14-12-13-18 |
| 5 | 14-15-12-18-17 |
| 6 | 14-15-16-17-18-12 |
| 7 | 14-13-18 |
| 9 | 12-15-14-13-18-17 |

Figure 6A:
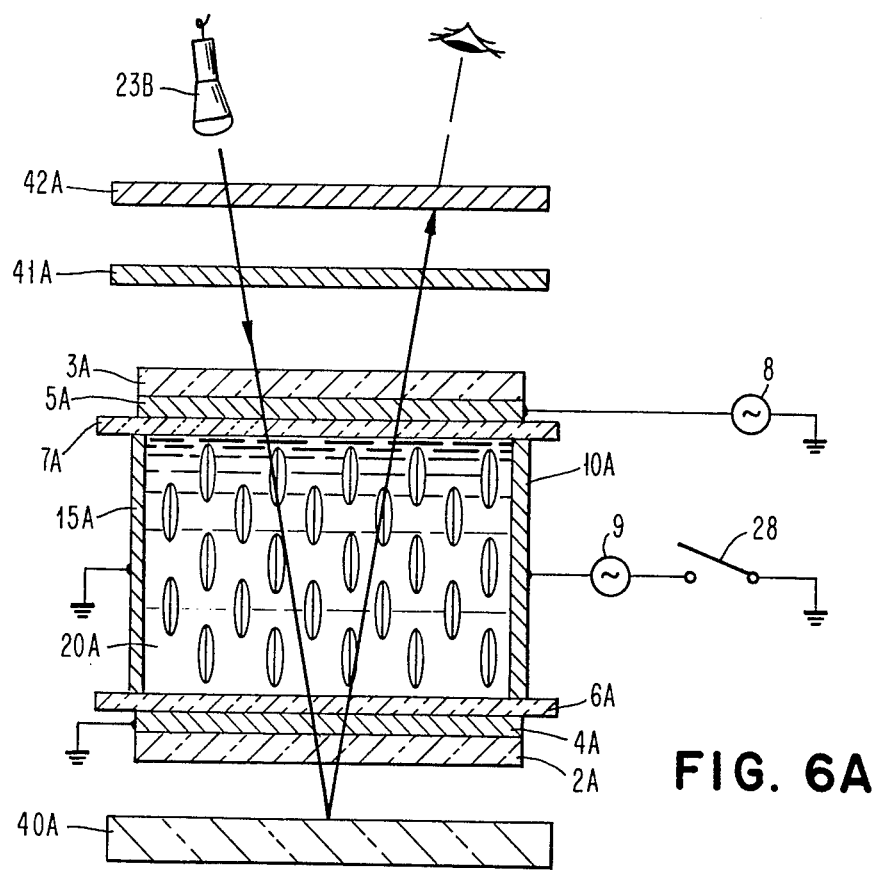
FIGS. 6A and 6B are diagramatic representations of the embodiment of FIG. 4 for illustrating the reflective operating mode thereof.

FIG. 6A shows another embodiment of the invention utilizing a mirror in conjunction with polarizing and quarter wave elements employed as a cross-polarizing means for differentiating the isotropic and anisotropic orientation of a nematic liquid crystal film 20. Except as otherwise indicated, the same numerical designations are employed for this embodiment as employed for the preceeding embodiment. Basically, this embodiment is substantially identical to the preceeding embodiment for purposes of explanation.

Figure 6B:
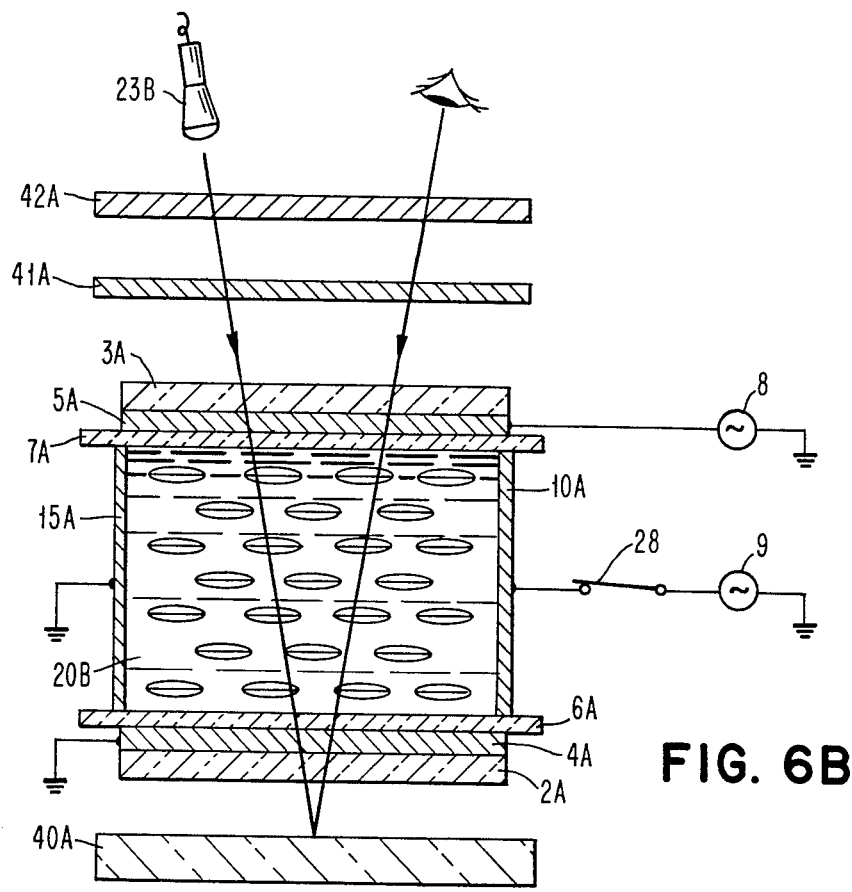

The cross polarizing means are formed by deposition of a reflective film 40 (e.g. chromium and the like) on one side of the liquid crystal cell which normally will be on the external face or surface of the transparent back support plate 2. Although the reflecting element 40 is shown as laminated to the liquid cell structure, it is to be understood that discrete reflecting elements having a specular surface adjacent the liquid cell structure can also be employed where desired or required for particular applications. The same also applies to the utilization of the quarter wave plate and polarizer elements, which although they can be used in discrete forms, as here shown, are preferably integrated with the liquid crystal cell by lamination of a quarter wave plate 41 to the exterior surface of the transparent front support 3 followed by lamination of an overlying polarizer element 42, over the quarter wave plate. This embodiment is schematically shown in FIGS. 6A and 6B illustrating the use of a reflecting element 40A, a quarter wave plate 41A and a polarizer element 42A. As can be seen from the drawings, this embodiment is structured for a reflective mode of operating the liquid crystal display.

Figure 7B:
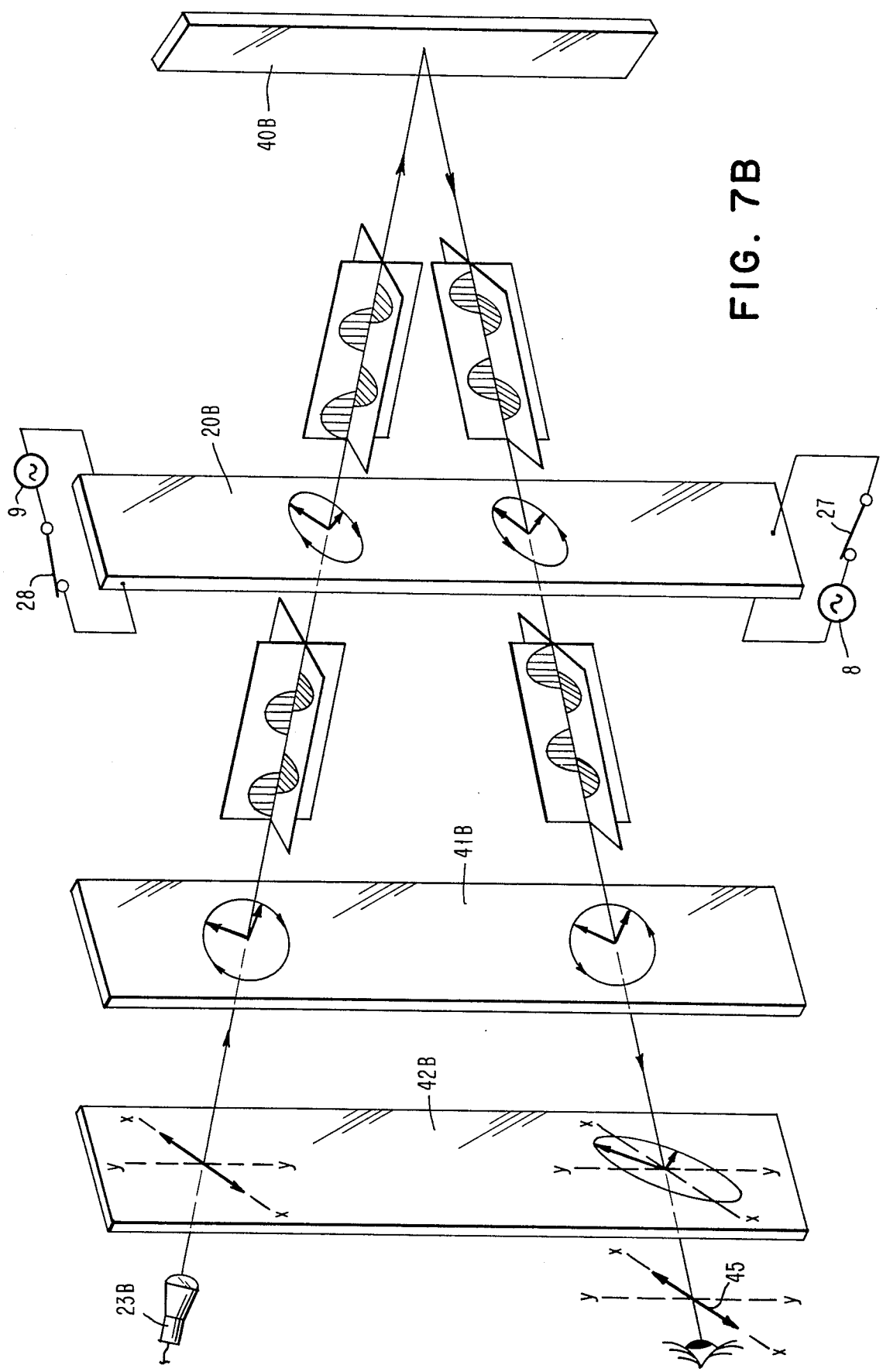

With reference to FIG. 6A, as in the preceeding embodiment, the electrodes 4A and 5A in the direction of light transmission are continuously exercised from an a.c. voltage source 8, to conversely maintain a continuous electric field between them which isotropically oriented the liquid crystal film 20A by molecular alignment of the material in the direction of the applied electric field. In this embodiment, (with isotropic orientation of the liquid crystal film 20B) incident light on passage through polarizer element 42B (as illustrated in the explanatory diagrams of FIG. 7) is plane polarized in the direction indicated by the vector 50 on the outgoing side of the polarizing element. On passage of the light beam through the quarter wave plate 41B, the ordinary and extraordinary electric components of the polarized beam are phase shifted to circularly polarize the beam as illustrated on the outgoing face of the quarter wave plate 41B with the circularly polarized beam passing unaffected through the liquid crystal film 20B in view of its isotropic molecular orientation (by virtue of impressing an electric field across the front and back faces thereof from signal source 8 and without the presence of a crossing electrode field in view of the open switch 28 from signal source 9).

When the circularly polarized light beam is reflected from the reflecting element 40B, the sense of rotation is reversed by virtue of the reflection, as illustrated on the impinging face of the liquid crystal film 20B through which it passes unaffected onto the quarter wave plate 41B. On re-entry of the light beam through the quarter wave plate, an additional quarter wave phase shift is added on emergence from the quarter wave plate. The total change in face of the light resulting from the second entry into and from exiting the quarter wave plate 41B, results in an additional quarter wave phase shift, with the total change in phase of the light beam resulting in a total of a one-half of a wave length which transforms these circularly polarized beams back into a light ray taht is that polarized in a plane 90° to its original entrance plane. As a result the back reflected light beam is absorbed by the polarizing element 42B to extinguish the beam in the image areas as indicated by the broken portion 52 of the beam.

While maintaining the electric field across electrodes 4A and 5A, the liquid crystal display is exercised by the overlying of a dominating cross-electric field between electrode pairs 10A/15A by virtue of their connection on closing switch 28 to voltage source 9. This dominating cross-field between electrode 10A/15A results in the molecular re-orientation of the liquid crystal film 20A to place the material in an anisotropic mode in the liquid beam path.

As in the isotropic mode of the liquid crystal film 20B, a light beam 23 on passage through the polarizing element 42B and 41B is circularly polarized prior to entry onto the liquid crystal film 20B. In view of the anisotropic configuration of the liquid crystal film 20B, it functions as a retardation plate which results in a further phase shift of the ordinary and extraordinary components of the light beam resulting in the eliptical polarization of the beam which on being reflected from a mirror surface 40B has its sense of rotation reversed as indicated on the impinging return side of the liquid crystal film 20B. When the return light beam reemerges from the anisotropically orientated liquid crystal film 20B, a further phase shift is induced between the ordinary and extraordinary components of the beam to modify the eliptical rotation thereof as shown on the return side of the quarter wave plate 41B. Reentry into and reemergence from the quarter wave plate 41B results in an additional phase shift of the ordinary and extraordinary components of the light beam with further modification of eliptical polarization as illustrated on a return side of the polarizing element 42B. At the polarizing element 42B the resultant component of the light beam perpendicular to the original plane of rotation of the polarizing element 42B is blocked from passage therethrough, while the resultant component parallel to the original planar polarization passes therethrough as an image 45 in the viewing plane. On exercising of the imaging electrodes in a manner described above, corresponding information displays can be created, e.g. the numeric display discussed above.

While the invention has been particularly shown and described with reference to particular embodiments thereof, it will be understood by those skilled in the art that the foregoing and other changes in form and details may be made therein without departing from the spirit and scope of the invention.

What is claimed is:

1. A liquid crystal cell comprising:
   A. a body of liquid crystal material having positive dielectric anisotropy;
   B. mutually orthogonal electrical cross-field means for selectively orienting said material in isotropic and anisotropic modes along an optical path; and
   C. means for differentiating isotropic and anisotropic light transmission through said material along said path,
   D. wherein said differentiating means comprises cross-polarizing means disposed along said path, wherein said cross-polarizing means comprises
   E. a polarizing element and a quarter wave plate intermediate thereto and one-side of said material and
   F. reflecting means adjacent an opposite side of said material.

2. A liquid structure comprising a cell defined by:
   A. a body of nematic liquid crystal material having positive dielectric anisotropy;
   B. means for forming mutually orthogonal electrical cross-fields across said material;
   C. means for selectively inducing dominance in one of said cross-fields to selective orient said material in optional isotropic and anisotropic modes along an optical path; and
   D. means to differentiate isotropic and anisotropic transmission of light through said material along said path,
   E. wherein said differentiating means comprises cross-polarizer means disposed along said path, wherein said cross-polarizer means comprises
   F. a polarizing element and
   G. a quarter wave plate intermediate thereto and on one side of said material, and
   H. a reflecting means adjacent an opposite side of said material.

3. A liquid crystal structure comprising cells defined of:
   A. a layer of nematic liquid crystal material having positive dielectric anisotropy;
   B. first and second transparent and opposed electrodes enclosing said liquid crystal layer,
   C. first and second transparent dielectric films on the inner faces of respective ones of said first and second electrodes in insulating relationship to said liquid crystal layer;
   D. third and fourth spaced electrodes
      a. disposed between said dielectric films and
      b. confining a portion of said liquid crystal layer therebetween,
   E. first means for coupling said third and fourth electrodes to a voltage source for generating a first electric field in a first direction to an isotropically orient said liquid crystal material therebetween in a first direction parallel thereto and
   F. second means for coupling said first and second electrodes to a second voltage source for generating a second field to isotropically orient said liquid crystal material therebetween in a second direction parallel thereto and transverse said first direction.

4. The liquid crystal structure of claim 3 wherein said first coupling means is adapted to connect said second and third electrodes in permanent relationship to said first voltage source during operation of said structure for generating a fixed field in said first direction to anistropicality orient said nematic material along an optical path therethrough; and said second coupling means is to selectively connect said first and second electrodes to said second voltage source generating a dominating field in said second direction to isotropical orient said material along said optical path.

5. The liquid crystal structure of claim 3 including cross-polarizer means for controlling passage of light through said liquid crystal material transverse said first direction.

6. The liquid crystal structure of claim 5 wherein said cross-polarizer means are laminated to said structure.

7. The liquid structure of claim 6 wherein said cell comprises one of a plurality in a liquid crystal display.

8. The liquid crystal structure of claim 5 wherein said cross-polarizer means for transmissive operating modes comprises a polarizer element adjacent said first electrode and cross-polarizing element adjacent said second electrode along an optical path transverse said first direction.

9. The liquid structure of claim 8 wherein said cell comprises one of a plurality in a liquid crystal display.

10. The liquid crystal structure of claim 8 wherein both said polarizing elements are laminated to said structure.

11. The liquid structure of claim 10 wherein said cell comprises one of a plurality in a liquid crystal display.

12. The liquid crystal structure of claim 5 wherein said cross-polarizer means comprises a quarter wave plate adjacent said first electrode; polarizer means adjacent said plate; and reflecting means adjacent said second electrode.

13. The liquid structure of claim 12 wherein said cell comprises one of a plurality in a liquid crystal display.

14. The liquid cell structure of claim 12 wherein the said quarter wave plate and said polarizer and reflecting means are laminated on said structure.

15. The liquid structure of claim 14 wherein said cell comprises one of a plurality in a liquid crystal display.

16. The liquid structure of claim 5 wherein said cell comprises one of a plurality in a liquie crystal display.

17. The liquid crystal structure of claim 3 including front and back transparent support having said first and second electrodes coated on respective inner-opposed faces thereof.

18. The liquid structure of claim 17 wherein said cell comprises one of a plurality in a liquid crystal display.

19. The liquid crystal structure of claim 18 including cross-polarizer means for controlling passage of light through said liquid crystal material transverse said first direction.

20. The liquid crystal cell structure of claim 19 wherein said cross-polarizer means comprises a quarter wave plate adjacent said front electrode; a polarizing means adjacent said plate; and a reflecting surface adjacent said back support.

21. The liquid cell structure of claim 20 wherein said quarter wave plate and said polarizing element are laminated to said front support, and said reflecting means comprises a laminate on said back support.

22. The liquid crystal cell structure of claim 19 wherein said cross-polarizer means comprises a polarizing element adjacent said front support and a cross-polarizing element adjacent said back support.

23. The liquid cell structure of claim 22 wherein both said polarizing elements are laminated to respective ones of said front and back supports.

24. The liquid cell structure of claim 19 wherein said cross-polarizer means is laminated to said supports.

* * * * *